United States Patent [19]

Yamauchi et al.

[11] Patent Number: 5,026,668
[45] Date of Patent: Jun. 25, 1991

[54] APPARATUS AND METHOD FOR PRODUCING SEMICONDUCTOR DEVICE

[75] Inventors: Shunji Yamauchi; Minoru Tanaka; Kenitiro Sakamoto; Yutaka Morita; Toru Kidera; Hiroki Mieda, all of Fukuoka Prefecture, Japan

[73] Assignee: Mitsubishi Denki Kabushiki Kaisha, Japan

[21] Appl. No.: 436,747

[22] Filed: Nov. 15, 1989

Related U.S. Application Data

[62] Division of Ser. No. 206,743, Jun. 15, 1988, Pat. No. 4,934,920.

[30] Foreign Application Priority Data

| Jun. 17, 1987 | [JP] | Japan | 62-151654 |
| Nov. 30, 1987 | [JP] | Japan | 62-303689 |
| Nov. 30, 1987 | [JP] | Japan | 62-303691 |
| Dec. 18, 1987 | [JP] | Japan | 62-322009 |

[51] Int. Cl.⁵ .......................................... H01L 21/46
[52] U.S. Cl. .................................. 437/210; 437/212; 437/217; 437/250; 437/949
[58] Field of Search ............... 425/73, 405.1; 156/381, 156/382; 437/180, 249, 250, 949, 209, 210, 212, 217; 264/39, 272.17; 118/50, 50.1

[56] References Cited

U.S. PATENT DOCUMENTS

| 3,469,560 | 9/1969 | Bukkila et al. |  |
| 4,534,921 | 8/1985 | Fierkens et al. | 264/39 |
| 4,577,918 | 3/1986 | Kasdagly | 264/135 |
| 4,632,653 | 12/1986 | Plocher . |  |
| 4,642,208 | 2/1987 | Masaru | 264/39 |
| 4,660,464 | 4/1987 | Tanaka . |  |
| 4,741,787 | 5/1988 | Shimizu et al. | 156/64 |
| 4,890,780 | 2/1990 | Mimata et al. | 264/272.17 |
| 4,934,920 | 6/1990 | Yamauchi et al. | 425/73 |

FOREIGN PATENT DOCUMENTS

| 1012 | 3/1979 | European Pat. Off. . |  |
| 61-46967 | 7/1980 | Japan . |  |
| 58-67429 | 4/1983 | Japan . |  |
| 60-132716 | 7/1985 | Japan . |  |
| 60-245523 | 12/1985 | Japan | 425/73 |
| 61-131461 | 6/1986 | Japan . |  |

Primary Examiner—Olik Chaudhuri
Assistant Examiner—Andrew Griffis
Attorney, Agent, or Firm—Leydig, Voit & Mayer

[57] ABSTRACT

An apparatus for producing a semiconductor device includes a dust-proof cover which covers a dust-generating portion in the apparatus such as a mold for effecting resin-molding of the semiconductor device composed of a lead frame and semiconductor chips wire- and die-bonded thereto, and a dust collecting device for collecting dust which is suspended by the air inside the dust-proof cover.

3 Claims, 5 Drawing Sheets

APPARATUS AND METHOD FOR PRODUCING SEMICONDUCTOR DEVICE

This application is a division of U.S. patent application Ser. No. 07/206,743, filed June 15, 1988, now U.S. Pat. No. 4,934,920.

BACKGROUND OF THE INVENTION

1. Field of the Invention

The present invention relates to an a method for and, more particularly, to a production apparatus and method which are providing a more dust-free environment particularly for the production of semiconductor devices.

2. Description of the Related Art

FIG. 1 illustrates a known resin molding apparatus for resin-molding a semiconductor device. This apparatus is disclosed in Japanese Patent Laid-Open Publication No. 55-96642. This apparatus is provided in the center thereof with a press machine 1 which is equipped with an upper platen 2 and a lower platen 3 which are disposed to oppose each other. The upper platen 2 is in place by means of tie-bars 4. The lower platen 3 is connected to a hydraulic cylinder 5 be for sliding up and down the tie-bars 4 by the hydraulic cylinder 5. An upper mold part 6 of a mold is provided on the lower face of the upper platen 2, while a lower mold part 7 cooperating with the upper mold part 6 is disposed on the upper face of the lower platen 3, such that the upper and lower mold parts vertically oppose each other. The lower mold part 7 is provided with a plurality of cavities for receiving semiconductor chips bonded to a lead frame and a pot for receiving a tablet. These cavities are connected to the pot through runners. The upper mold part 6 also has a plurality of cavities corresponding to those in the lower mold part 7.

A loader 8 is disposed on a lateral side of the press machine 1 for supplying a lead frame and a tablet onto the lower mold part 7 of the press machine 1. An unloader 9 is disposed on the other lateral side of the press machine 1 for taking out the resin-molded semiconductor device from the press machine 1. A magazine 10 for storing finished semiconductor devices is disposed under the unloader 9. On the other hand, as shown in FIG. 2, a cleaner 11 is disposed behind the press machine 1 for the purpose of removing burrs of resin which become attached to the upper and lower mold parts 6 and 7 during the molding. A dust collector (not shown) is connected to the cleaner 11 through a duct 12.

The press machine 1, the loader 8, the unloader 9, the magazine 10 and the cleaner 11 are covered by a cover 13. As will be seen from FIG. 3, the cover 13 has a frame 13a provided on ridge portions of the resin molding apparatus and a thin plate 13b fixed to the frame 13a by means of screws 13c.

The operation of the described semiconductor resin molding apparatus is as follows. A lead frame (not shown) is prepared with semiconductor chips die-bonded thereto, with the electrodes of the semiconductor chips wire-bonded thereto. A tablet (not shown) also is provided. The lead frame and the tablet are fed onto the lower mold part 7 on the lower platen 3 of the press machine 1 by means of the loader 8. In this state, the semiconductor chips bonded to the lead frame and the tablet are respectively disposed in the cavities and the pot. Then, the hydraulic cylinder 5 operates to raise the lower platen 3 along the tie bars 4 so that the upper and lower mold parts 6 and 7 are brought together to close the mold. Then, the tablet received in the pot is heated and melted by a suitable heating means such as a heater. The molten tablet is forced out by a plunger or the like means and injected through the runners into the cavities, whereby the semiconductor chips are resin-molded.

The resin with which the semiconductor chip and the lead frame are sealed is then cooled and solidified. Subsequently, the lower platen 3 is lowered along the tie-bars 4 by the force of the hydraulic cylinder 5, so that the product is taken out by an unloader 9 and placed in the magazine 10. Subsequently, the resin burrs adhering to the upper and lower mold parts 6 and 7 are removed by the cleaner 11 and the resulting fine pieces of the resin are absorbed and collected by the dust collector through the duct 12.

This known apparatus for producing semiconductor devices suffers from the following disadvantages. Both the frame 13a and the thin plate 13b constituting the cover 13 covering the whole resin molding apparatus are rigid. Therefore, often that a gap 13d is undesirably formed between the frame 13a and the thin plate 13b as shown in FIG. 3 due to the deflection of the thin plate 13b between adjacent fixing screws 13c and surface roughness between the frame 13a and the thin plate 13b.

Such a gap 13d undesirably allows, particularly when the pressure in the cover 13 is equal to or higher than the external pressure, various dust particles suspended by the air within the cover to be released to the exterior of the cover 13. The dust particles include fine pieces of resin produced after the removal of burrs, resin powder produced from the tablet and dusts generated by the actuator itself. In some cases, a blast of air is applied to the mold in advance of or simultaneously with the cleaning by the cleaner 11. As a result, the dust particles which have collected in the cover 13 are released to the outside of the cover 13.

For these reasons, the resin molding apparatus has to be operated in a clean room which is separated from the room in which the die bonding and wire bonding, steps of the same finishing process as the resin molding, are conducted. In consequence, difficulty is encountered in the design of a continuous process line which can automatically conduct all the steps of the process, including the resin molding, which are liable to be affected by dusts. The fine pieces of resin which could not be collected by the cleaner are scattered around the press machine, adversely affecting the durability of the actuator and sliding portions of the apparatus.

SUMMARY OF THE INVENTION

Accordingly, an object of the present invention is to provide a production apparatus and a production method for producing semiconductor devices, improved to eliminate the discharge of dust to the environment, while diminishing the tendency of deterioration of the actuator and sliding parts of the apparatus attributable to generation of dusts, thereby overcoming the above-described problems of the prior art.

To this end, according to one aspect of the present invention, there is provided an apparatus for producing semiconductor devices, comprising a dust-proof cover which shields the semiconductor chips and the lead frame from the ambient air and a dust collecting means for sucking air out of the dust-proof cover to suck dusts from the interior of the dust-proof cover.

According to another aspect of the present invention, there is provided a method of producing semiconductor devices, comprising the steps of: covering, at least, the semiconductor chip and the lead frame with a dust-proof cover; cleaning the interior of the dust-proof cover; and then executing a production process on the semiconductor chips and the lead frame.

DESCRIPTION OF THE PREFERRED EMBODIMENTS

Figure 1:
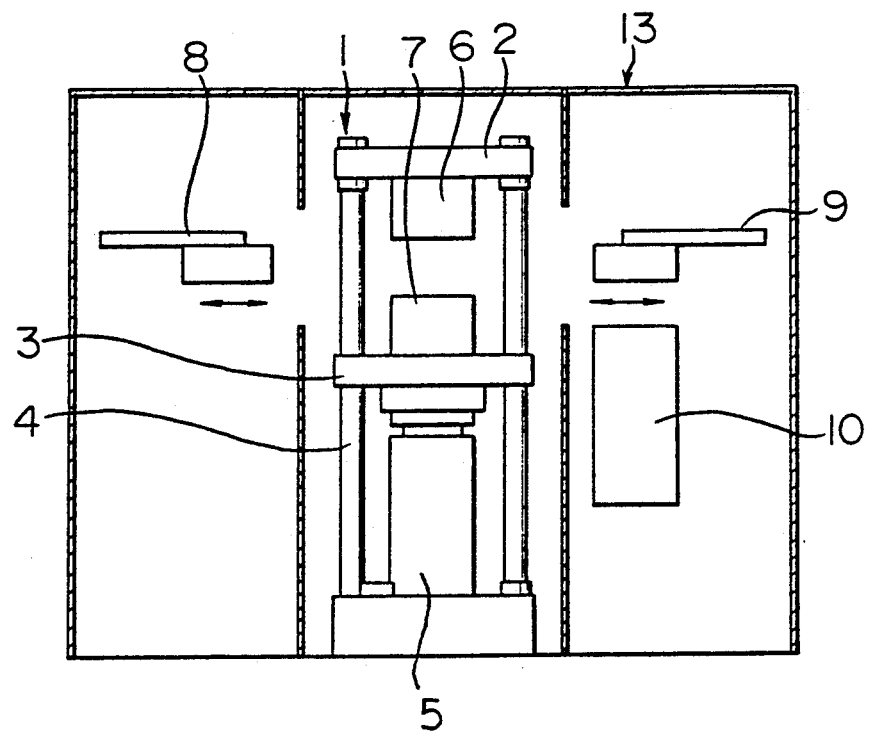
FIG. 1 is a sectional view of a resin molding apparatus in a known apparatus for producing semiconductor devices.
Figure 2:
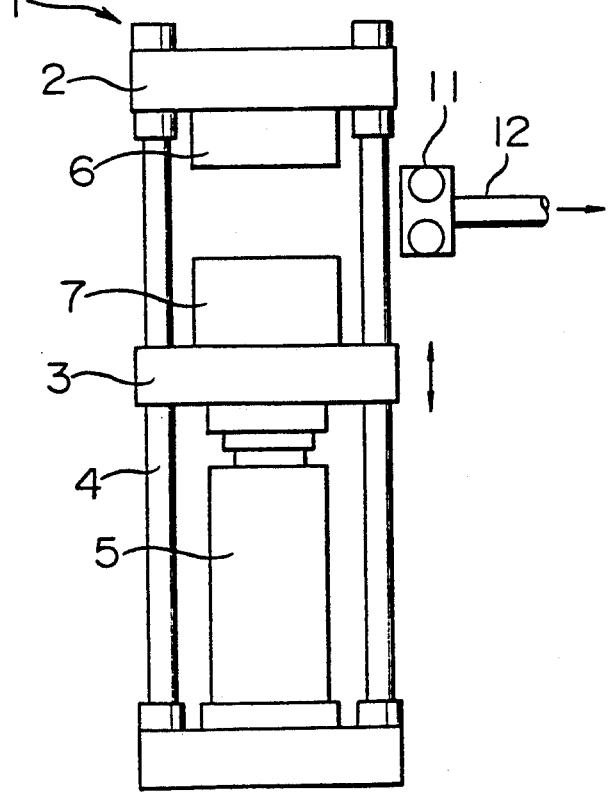
FIG. 2 is a side elevational view of a press machine incorporated in the apparatus shown in FIG. 1.
Figure 3:
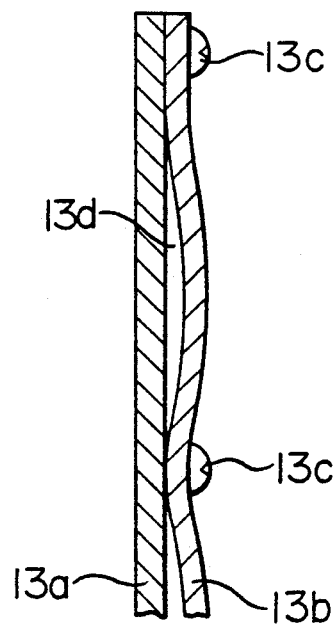
FIG. 3 is a partial sectional view illustrating a cover incorporated in the apparatus shown in FIG. 1.
Figure 4:
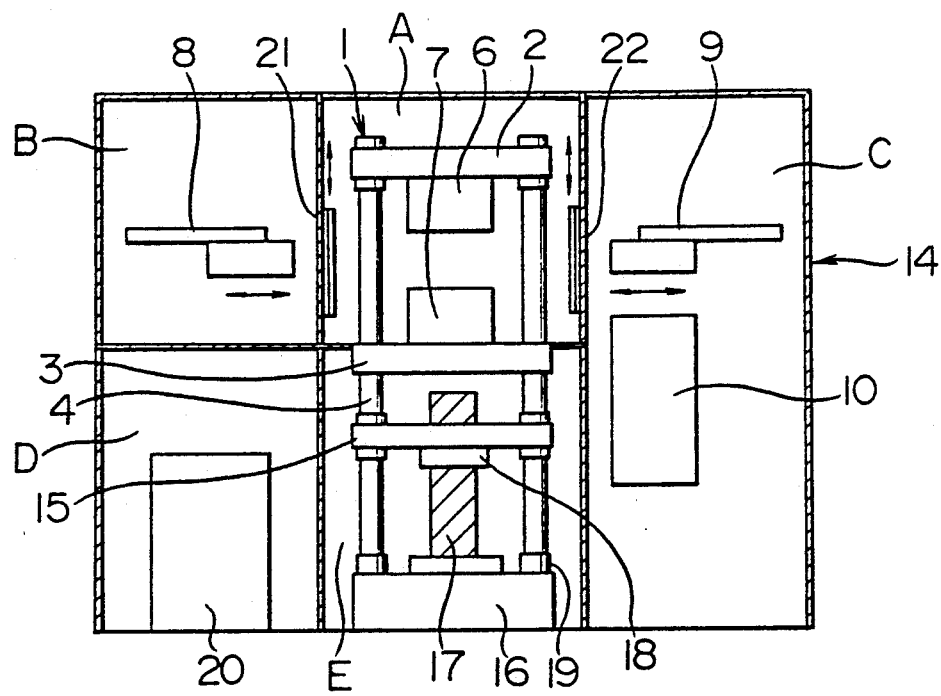
FIGS. 4 and 5 are a front view and a sectional side view of a resin molding apparatus in accordance with a first embodiment of the present invention.

A first embodiment of the present invention will be described with reference to FIGS. 4 to 7. Referring to FIG. 4, a press machine 1 disposed in a dust-proof cover 14 has an upper platen 2 and a lower platen 3. The lower platen 3 is fixed to the dust-proof cover 14, while the upper platen 2 is connected to the tie-bars 4. The tie-bars 4 slidably extend through the lower platen 3 and are fixed to a holder 15 at the lower side of the lower platen 3. A reduction gear 16 connected to a motor (not shown) is disposed at the lower side of the press machine 1, so that the power of the motor is transmitted to a ball screw 17. A nut 18 screwed to the ball screw 17 is fixed to the holder 15. As the motor operates, the holder 15 and the platen 2 are moved up and down. A reference numeral 19 designates guides which slidingly engage with the tie-bars 4.

An upper mold part 6 and a lower mold part 7 are secured to the lower side of the upper platen 2 and to the upper side of the lower platen 3 to oppose each other. The lower mold part 7 is provided with a plurality of cavities for receiving semiconductor chips bonded to a lead frame and a pot for receiving a tablet. These cavities are connected to the pot through runners. The upper mold part 6 also has a plurality of cavities corresponding to those in the lower mold part 7.

A loader 8 is disposed on a lateral side of the press machine 1 for supplying a lead frame and a tablet onto the lower mold part 7 of the press machine 1. An unloader 9 is disposed on the other lateral side of the press machine 1 for taking out the resin-molded semiconductor device from the press machine 1. A magazine 10 for storing finished semiconductor devices is disposed under the unloader 9. On the other hand, as shown in FIG. 5, a cleaner 11 is disposed behind the press machine 1 for the purpose of removing burrs of resin which are attached to the upper and lower mold parts 6 and 7 during the molding.

The dust-proof cover 14 surrounds the whole of the resin molding apparatus and is constructed such that its interior is divided into five zones A to E. The first zone A accommodates the actuating portion for actuating the press machine 1 which effects the resin molding of the semiconductor chip and the lead frame. A second zone B accommodates feeding means which includes the loader 8, while a third zone C accommodates ejecting means including the unloader 9 and the magazine 10. A fourth zone D accommodates a controller 20 for controlling the press machine 1, feeding means and the ejecting means. A fifth zone E receives a machine part of the press machine 1 including the speed reduction gear 16, ball screw 17 and the holder 15.

A first shutter 21 is disposed on the boundary between the first zone A and the second zone B and for automatically opening and closing in synchronization with the operation of the loader 8 under the control of the controller 20 in the fourth zone D. On the other hand, a second shutter 22 is disposed on the boundary between the first zone A and the third zone C, and for opening and closing in synchronization with the operation of the unloader 9 under the controller 20 in the fourth zone D.

Figure 5:
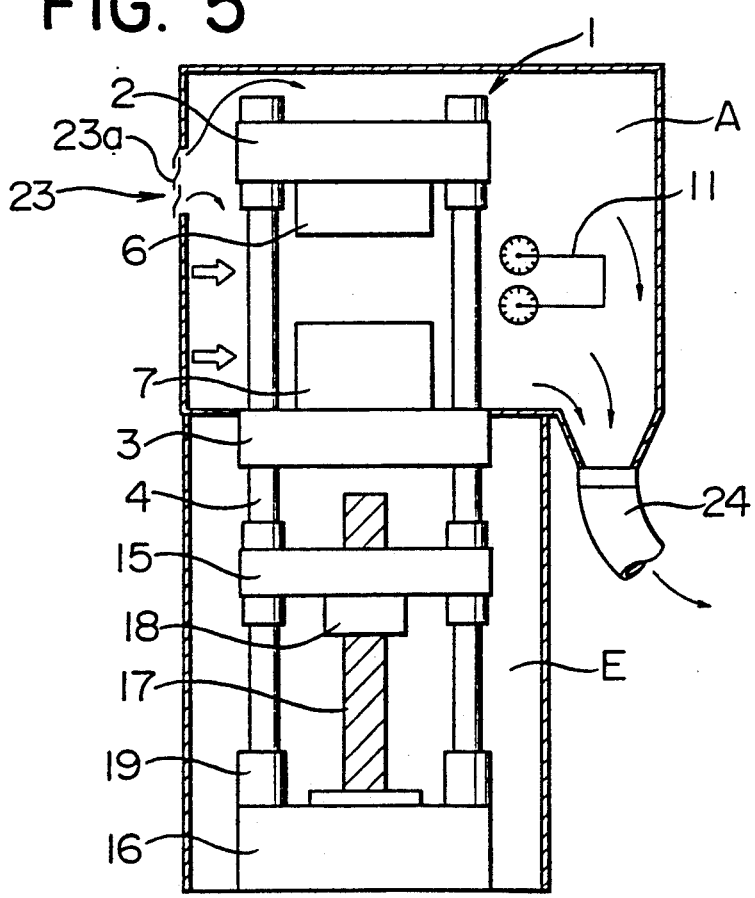

Referring now to FIG. 5, the front portion of the dust-proof cover 14 surrounding the first zone A has an air inlet 23 at a front portion thereof and a dust collecting duct 24 on a rear portion thereof. In order to prevent any foreign matter from coming into the dust-proof cover 14, a baffle plate 23a is provided in the air inlet 23 extending downwardly and outwardly. It is possible to provide, in addition to or in place of the baffle plate 23a, a filter which covers the air inlet 23 to prevent foreign matter from coming into the interior of the cover 14. Each of the second and the third zones B and C is provided with similar air inlets 23 and dust collecting ducts 24. A dust collecting device (not shown) is commonly connected to the dust collecting ducts 24 of the first to the third zones A to C. An air nozzle (not shown) for blowing air against the upper and lower mold parts 6 and 7 is provided on the front inner wall of the dust-proof cover 14 which surrounds the first zone A.

Figure 6:
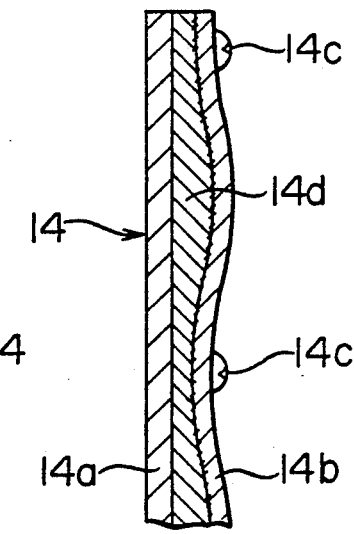
FIG. 6 is a partial sectional view illustrating a dust-proof cover used in the apparatus shown in FIG. 4.

The dust-proof cover 14 has, as shown in FIG. 6, a frame 14a, a thin plate 14b fixed by screws 14c to the frame 14a and an elastic member 14d provided between the frame 14a and the thin plate 14b. The frame member 14a is made of a rigid material and has portions which extend along the ridges of the respective zones. The thin plate 14b is made of steel or any other suitable material such as an acrylic resin. The elastic member 14d is made of, for example, a rubber.

Figure 7:
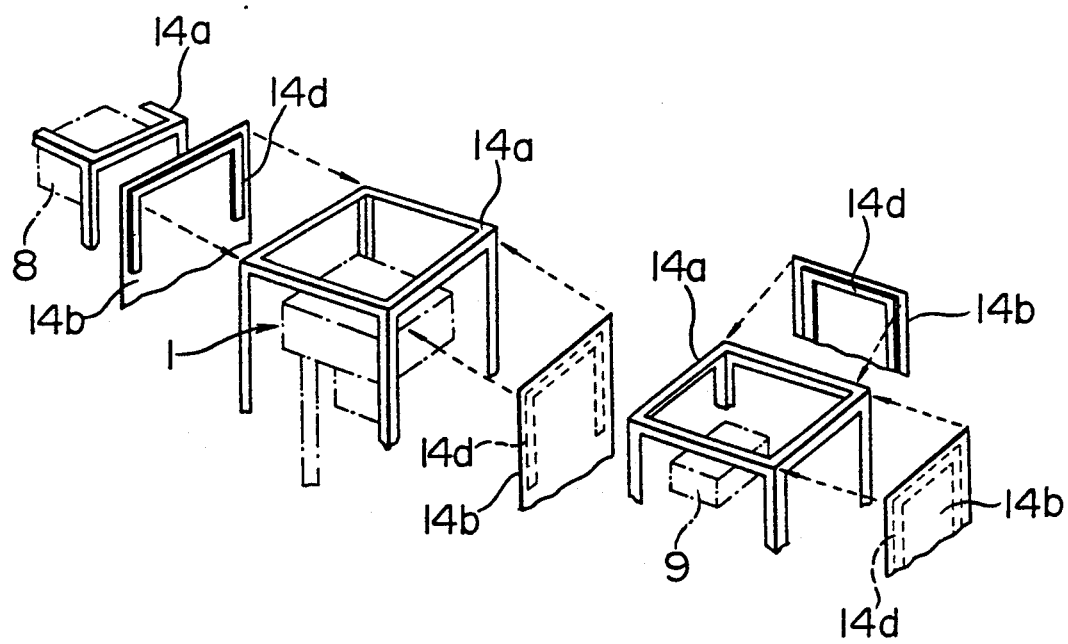
FIG. 7 is an illustration of the assembly of the dust-proof cover.

The dust-proof cover 14 is assembled in a manner which will be explained hereinunder with reference to FIG. 7. As the first step, the frame 14a is placed along the edges of the respective zones A to E, to surround the actuating portion for actuating the press machine 1, feeding means, ejecting means, controller and the mechanical part of the press machine 1. At the same time, the elastic member 14d is fixed by, for example, an adhesive, at its portion where it is to be joined to the frame 14a. The elastic member 14d fixed to the frame 14a is brought into close contact with the frame 14a and is temporarily fixed to the latter by means of an adhesive. Subsequently, the thin plate 14b is fixed to the frame 14a by means of the screws 14c (as shown in FIG. 6). Since the thin plate 14b is mounted on the frame 14a through the intermediary of the elastic member 14d, it is possible to eliminate any gap between the frame 14a and the thin plate 14d which may otherwise exist due to the roughness of the surfaces of the frame 14a and the thin plate 14b or due to a partial deflection of the thin plate 14b between adjacent screws 14c after the mounting of the thin plate 14b. The first shutter 20 and the second shutter 21 may be already attached to the thin plate 14b. The air inlets 22 also may be formed in the thin plate 14b before the assembly of the cover. The dust collecting ducts 24 are connected to the dust-proof cover 14 thus formed.

The operation of this embodiment is as follows.

Prior to the start of the production process, the first to the third zones A to C are evacuated with the maximum vacuum of 3000 mmAq at a rate of 6 m³/min by means of the dust collecting duct 24 so that a negative pressure on the order of $-10$ mmAq is established and maintained in these zones A to C.

Subsequently, the controller 20 in the zone D operates to open the first shutter 21. Meanwhile, a tablet (not shown) and a lead frame (not shown) to which semiconductor chips have been die-bonded and wire-bonded are prepared. The lead frame and the tablet thus prepared are then fed onto the lower mold part 7 on the lower platen 3 of the press machine 1. The semiconductor chips bonded to the lead frame and the tablet in this state are respectively placed in the cavities and the pot formed in the lower mold part 7. Subsequently, the controller 20 operates to close the first shutter 21 and, at the same time, the motor (not shown) of the press machine 1 operates to lower the upper platen 2 together with the tie-bars 4, whereby the upper mold part 6 and the lower mold part 7 are brought together to close the mold.

Then, the tablet in the pot is heated and melted by a suitable heating means such as a heater, and is forced out by, for example, a plunger so and injected into the cavities through the runners, whereby the semiconductor chips are molded and sealed by the resin.

Thereafter, the resin sealing the semiconductor chips is cooled and solidified and, the controller 20 operates to activate the motor and raise the upper platen 2. At the same time, the second shutter 22 is opened so that the molded semiconductor device as the product is taken out of the mold by the unloader 9 and is stored in the magazine 10.

After the product is taken out by the unloader 9, the controller 20 then operates to close the second shutter 22 and to start the cleaner 11 brushing on the upper and lower mold parts 6 and 7, whereby the resin burrs are removed from the upper and lower mold parts 6 and 7.

Subsequently, an air nozzle (not shown) provided on the front upper wall of the dust-proof cover 14 starts to blow air on the upper and lower mold parts 6 and 7 thereby blowing resin dust into the dust collecting duct 24. In this state, the interiors of the zones A to C are maintained at a reduced pressure so that the dust is prevented from being released outside of the dust-proof cover 14. Electronic devices such as the controller 20, as well as precision mechanisms such as the reduction gear 16, are disposed in the zones D and E which are separated from the zone A, so that they are kept away from the dust.

In the first embodiment as described, three zones A to C in the dust-proof cover 14 are connected through openings which are selectively closed by shutters. These zones A to C, however, may be formed as a continuous single space.

The first embodiment as described is applied to a resin molding apparatus. This, however, is only illustrative and the method of the present invention can be applied to other steps or apparatus in the process of manufacturing semiconductor devices, e.g., a die bonder or a wire bonder.

As has been described, according to the first embodiment of the present invention, it is possible to prevent the generation of dust and the scattering of the same. It therefore becomes possible to produce semiconductor devices in a clean room of a relatively low class, e.g., 10000 to 100000. In addition, production under inferior environmental condition becomes possible because the influence of the environmental conditions is reduced.

The dust collector used in the first embodiment may be replaced by other suitable devices such as a suction blower, vacuum cleaner or the like.

The arrangement also may be modified such that the pressure around the dust-proof cover is raised so that the interior of the dust-proof cover 14 is maintained at a relatively reduced pressure. It will be understood that the discharge of dust to the environment is avoided, so that the production in a clean room of a comparatively low level of cleanliness, as well as production under inferior environmental conditions, is possible even in such a modified arrangement.

A resin molding apparatus in accordance with a second embodiment of the present invention will be described with reference to FIG. 8.

Figure 8:
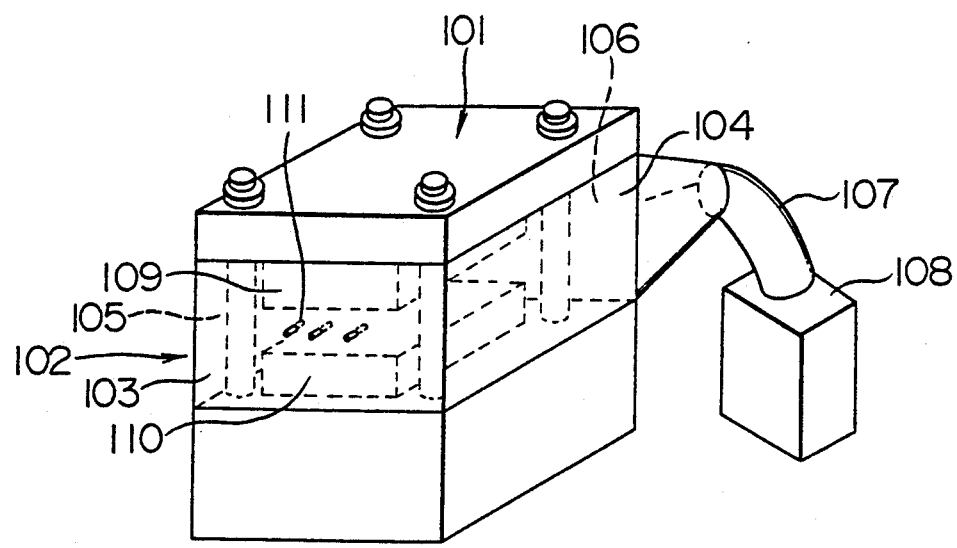
FIG. 8 is a perspective view of an apparatus in accordance with the second embodiment of the invention for producing semiconductor devices.

Referring to FIG. 8, an actuator portion of a press machine 1 which is a dust-generating source is hermetically sealed by a dust-proof cover 102. The dust-proof cover 102 is composed of a front cover 103, right side cover 104, left side cover 105 and a rear cover 106. As in the case of the dust-proof cover 14 of the first embodiment, each of these covers is constituted by a frame and a thin plate fixed to the frame through an elastic member. A dust collector 108 is connected to the rear cover 106 through a duct 107. Air nozzles 111 are provided on the front cover 103 for blowing air into the space between the upper mold part 109 and the lower mold part 110. Although not shown, doors similar to the shutters 21 and 22 in the first embodiment are provided in the right and left side covers 104 and 105.

The operation of this second embodiment is as follows.

A lead frame (not shown) carrying semiconductor chips die-bonded thereto with the electrodes of the chips wire-bonded thereto and a tables (not shown) are fed onto the lower mold part 110 as in the case of the first embodiment. Subsequently, the upper die part 109 and the lower die part 110 are brought together to close the mold. Then, the tablet is heated and melten, and is injected into the cavities thereby to resin-mold the semiconductor chips. After the curing of the resin, the molded semiconductor device on the lower mold part 110 is taken out of the dust-proof cover 102.

Subsequently, both the right and the left side covers 104 and 105 are closed and the brushing of the upper mold part 109 and the lower mold part 110 is carried out with the cleaner (not shown). During the brushing, air is blown from the air nozzles 110 so that the fine particles of the resin are colleted by the dust collected 108 through the duct 107.

Although in the described embodiment the air nozzles 111 for blowing off the fine resin pieces, such as those produced by removal of the resin burrs, are provided on the front cover 103, this is only illustrative and the nozzles may be provided both on the right and the left side covers 104 and 105 so as to attain higher dust collection efficiency. It is also possible to provide an arrangement such that the air is blown at controlled times from a plurality of nozzles, to attain a higher dust collecting efficiency.

In the second embodiment as described, the dust-proof cover 102 is designed and constructed to cover only the press machine actuator, and the interior of this dust-proof cover 102 is cleaned by the cooperation between the air nozzles 111 and the dust collector 108. It will be clear that this arrangement also is effective in preventing dust from being discharged to the exterior and to keep the semiconductor device before the resin molding from dust and other matters.

Figure 9:
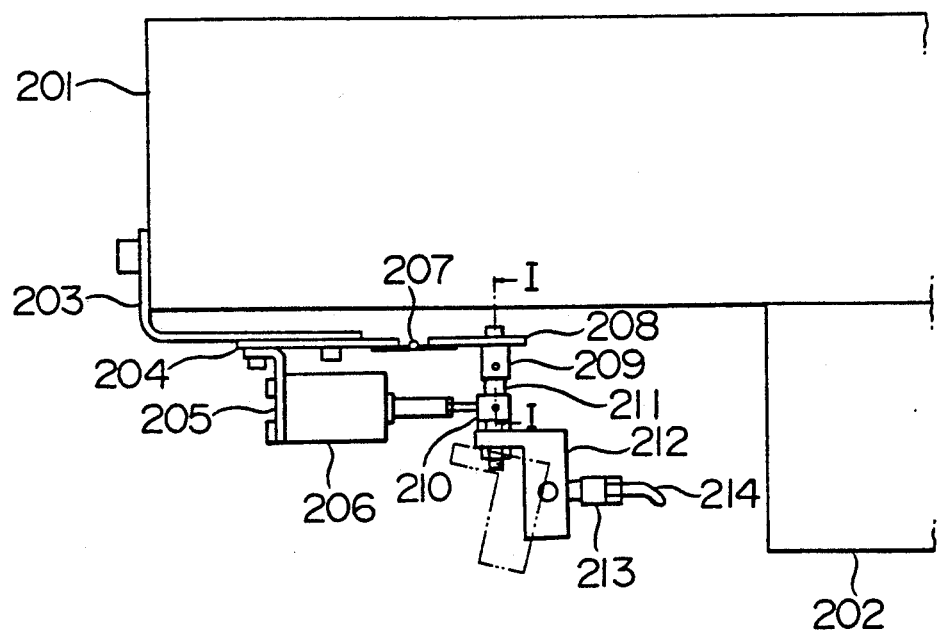
FIG. 9 is a partial side elevational view of a third embodiment in accordance with the present invention.
Figure 10:
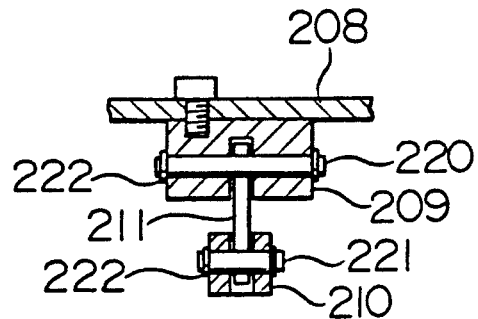
FIG. 10 is a sectional view taken along the line I=I of FIG. 9.

A third embodiment of the present invention will be described with reference to FIGS. 9 to 12. The third embodiment establishes air flow in the press machine actuating portion surrounded by a dust-proof cover, thereby attaining a higher dust collecting efficiency. In FIG. 9, the third embodiment has an upper mold part 202, a first mounting plate 203 attached to one side surface of the upper platen 201, a second mounting plate 204 secured to the first mounting plate 203, a third mounting plate 208 which is hinged to one end of the second mounting plate 204 by means of a hinge 207, and a fourth mounting plate 205 secured to the second mounting plate 204. A cylinder 206 is fixed to the fourth mounting plate 205. First and second shaft support members 209 and 210 are respectively secured to the third mounting plate 208 and the axial end of the cylinder 206. As will be seen from FIG. 10, shafts 220 and 221 are rotatably supported by the first and the second shaft support members 209 and 210. These shafts 220 and 221 are connected to each other through a link member 211 so that the shafts 220, 221 and the link member 211 in cooperation constitute a link mechanism. A numeral 222 designates a stopper ring for the shaft 220 and the shaft 221.

Figure 11:
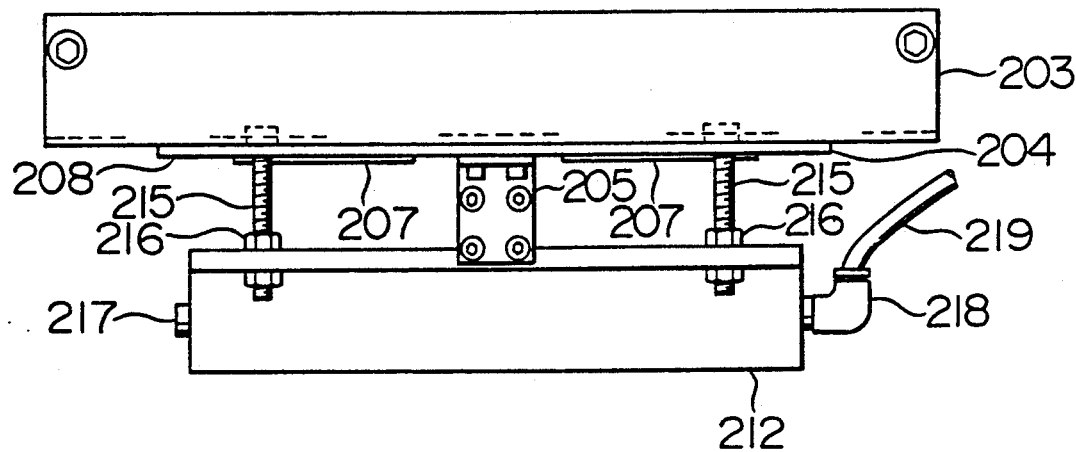
FIG. 11 is a front elevational view of the apparatus shown in FIG. 9.
Figure 12:
FIG. 12 is an enlarged view of an essential part of the apparatus shown in FIG. 9.

As will be seen from FIG. 11, a manifold 212 is secured to the third mounting plate 208 by means of bolts 215 and nuts 216. A pipe (not shown) is embedded in the manifold 212 extending in the longitudinal direction of the manifold 212. An air supply tube 219 is connected through a joint 218 to one end of the pipe. The other end of the pipe is closed by a plug 21/. The pipe is provided on one side thereof with a plurality of ring joints 213 disposed along the length of the pipe as shown in FIG. 9. A nozzle 214 made of, for example, copper is connected to each ring joint 213 as shown in FIG. 12. Thus, air supplied from the air supply tube 219 is blown from the respective nozzles 214.

As in the cases of the first and the second embodiments, the dust-proof cover surrounding the actuating portion of the press machine is provided with a dust collecting duct to which is connected a dust collector.

The operation of this embodiment will be described hereinunder. As the shaft of the cylinder 206 is reciprocatingly moved, the third mounting plate 208 is caused to swing through a predetermined angle corresponding to the stroke of the cylinder 206 about the hinge 207, by the action of the link mechanism which is composed of the shafts 220, 221 and the link member 211, so that the manifold 212 fixed to the mounting plate 208 swings. As the air is supplied from the air supply tube 219, air is blown from the respective nozzles 214 which swing together with the manifold 212 so that streams of air are formed to cover an extremely wide area in the dust-proof cover. Consequently, the dust suspended by the air in the dust-proof cover is caused to move along the stream of air and is efficiently sucked by the dust collecting device through a dust collecting duct connected to a portion of the dust-proof cover.

Although in the third embodiment the air nozzles or outlets are made to swing by the operation of the cylinder 206 and the link mechanism, this is only illustrative and the swing of the nozzles or the air outlet may be effected by suitable other means such as a combination of a motor and an eccentric cam.

Thus, in the third embodiment as described, the press machine incorporates a unit for oscillating the air nozzles or outlets to generate streams of air of a predetermined direction in the whole region of the space within the dust-proof cover. The dust generated in the portion of the semiconductor resin-molding apparatus covered by the dust-proof cover can be efficiently sucked out and removed.

In the third embodiment as described, the swinging mechanism is secured to the upper platen 201. This, however, is not exclusive and the swinging mechanism may be mounted on another structural portion such as, for example, the lower platen or other part of the press machine. The swinging mechanism may be provided even on the dust-proof cover.

What is claimed is:

1. A method of processing a semiconductor chip mounted on a lead frame comprising:
    shielding from ambient air a space around a semiconductor chip and a lead frame on which the chip is mounted with a dust-proof cover for containing dust created during processing of the chip and lead frame;
    carrying out the process on the lead frame and the semiconductor chip within said dust-proof cover that produces dust;
    directing a stream of a gas within the dust-proof cover and varying the flow direction of the stream within the dust-proof cover to blow the dust produced in the process into the space within the dust-proof cover; and
    collecting the dust from within the dust-proof cover.

2. The method of claim 1 wherein the gas is discharged into the dust-proof cover through a nozzle including varying the flow direction of the gas by oscillating the nozzle.

3. The method of claim 1 wherein said process comprises resin molding of the lead frame and semiconductor chip.

* * * * *